US009161199B1

(12) United States Patent
Sharma (10) Patent No.: US 9,161,199 B1
(45) Date of Patent: Oct. 13, 2015

(54) OVERRIDE OF DISTRIBUTION ALGORITHMS FOR AN OFFLINE CHARGING SYSTEM

(71) Applicant: Alcatel-Lucent USA Inc., Murray Hill, NJ (US)

(72) Inventor: Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/259,949

(22) Filed: Apr. 23, 2014

(51) Int. Cl.
*H04W 4/24* (2009.01)

(52) U.S. Cl.
CPC .................................. *H04W 4/24* (2013.01)

(58) Field of Classification Search
CPC ................................. H04W 4/20; H04W 4/24
USPC ............................................................. 455/406
See application file for complete search history.

(56) References Cited

U.S. PATENT DOCUMENTS 8,862,093 B2 * 10/2014 Zackrisson .................... 455/406

OTHER PUBLICATIONS

Calhoun, P., Diameter Base Protocol, Network Working Group, RFC 3588, Sep. 2003.
3rd Generation Partnership Project, Charging Data Record (CDR) Transfer, 3GPP TS 32.295, Version 12.0.0 (Sep. 2013).
3rd Generation Partnership Project, Charging Data Record (CDR) File Format and Transfer, 3GPP TS 32.297, Version 12.0.0 (Mar. 2014).

* cited by examiner

*Primary Examiner* — Marcos Torres
(74) *Attorney, Agent, or Firm* — Duft Bornsen & Fettig, LLP (57) ABSTRACT

Systems and methods that override CDF distribution algorithms for offline charging. One embodiment comprises a distributor unit that connects to a plurality of Charging Data Functions (CDFs) of an offline charging system. The distributor unit receives a Diameter request from a Charging Trigger Function (CTF) for a Diameter session, and determines whether the Diameter request includes an override parameter indicating a destination CDF for the Diameter session. When the Diameter request includes the override parameter, the distributor unit sends the Diameter request to the destination CDF if the destination CDF is available. When the Diameter request does not include the override parameter, the distributor unit selects the destination CDF based on a distribution algorithm, inserts the override parameter in the Diameter request indicating the destination CDF, and sends the Diameter request to the destination CDF.

20 Claims, 6 Drawing Sheets

OVERRIDE OF DISTRIBUTION ALGORITHMS FOR AN OFFLINE CHARGING SYSTEM

TECHNICAL FIELD

The present disclosure is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online charging functions to keep track of the resource usage incurred by each device for using the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS).

The CDF receives the charging events from one or more CTFs, and uses the information included in the charging events to construct CDRs. A CDR is a formatted collection of information about a chargeable event (e.g., time of call set-up, duration of the call, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

A typical operator network will utilize multiple CDFs and CGFs to implement offline charging. Thus, a front-end device, such as a Diameter Routing Agent (DRA), is used in conjunction with the OFCS to distribute charging events from the CTFs to the CDFs. The front-end device typically uses a distribution algorithm to select a CDF for a particular session. For example, a distribution algorithm may process a session identifier from a Diameter ACR with a hashing function or another function to select a CDF. The front-end device then routes the Diameter ACR to the selected CDF.

SUMMARY

Embodiments described herein provide an enhancement to Diameter protocol by adding an override parameter. The override parameter indicates a CDF identity for a Diameter session, and a front-end distributor can use to the CDF identity for routing Diameter requests instead of using a distribution algorithm. The base Diameter protocol provides for identification of peers with attribute-value pairs (AVPs), such as Origin-Realm, Origin-Host, Destination-Realm, and Destination-Host. However, when used with a front-end distributor, these AVPs in a Diameter request identify the distributor to the far end (CTF). The distributor has to choose a destination CDF for the Diameter request, and route the Diameter request to the destination CDF. Previously, a front-end distributor would have to select a destination CDF using a distribution algorithm (or a table-driven approach) each time it received a Diameter request (e.g., Diameter ACR). By adding the override parameter to Diameter protocol, the Diameter requests themselves can indicate a destination CDF for the requests so that the front-end distributor does not need to process the distribution algorithm for each Diameter request.

One embodiment comprises a distributor unit configured to connect to a plurality of CDFs of an offline charging system. The distributor unit is configured to receive a Diameter request (e.g., a Diameter Accounting Request (ACR)) from a Charging Trigger Function (CTF) for a Diameter session, and to determine whether the Diameter request includes an override parameter indicating a destination CDF for the Diameter session. When the Diameter request includes the override parameter, the distributor unit is configured to send the Diameter request to the destination CDF if the destination CDF is available. When the Diameter request does not include the override parameter, the distributor unit is configured to select the destination CDF based on a distribution algorithm, to insert the override parameter in the Diameter request indicating the destination CDF, and to send the Diameter request to the destination CDF.

In one embodiment, when the destination CDF indicated in the override parameter is not available, the distributor unit is configured to select an alternate destination CDF based on the distribution algorithm, to insert the override parameter in the Diameter request with a CDF identifier for the alternate destination CDF, and to send the Diameter request to the alternate destination CDF.

In one embodiment, the override parameter comprises a new Diameter Attribute Value Pair (AVP). The new Diameter AVP may have an attribute name of "CDF-Override" or something similar.

In another embodiment, the distributor unit is configured to receive a Diameter answer from the destination CDF that includes the override parameter, and to send the Diameter answer to the CTF.

In another embodiment, the CTF is configured to receive the Diameter answer from the distributor unit, and to store information for the destination CDF for the Diameter session. The CTF is further configured to generate another Diameter request for the Diameter session, to insert the override parameter in the other Diameter request indicating the destination CDF, and to send the other Diameter request to the distributor unit.

Another embodiment comprises a method of distributing Diameter requests. The method comprises receiving a Diameter request in a distributor unit from a CTF for a Diameter session, where the distributor unit connects to a plurality of CDFs of an offline charging system. The method further includes determining whether the Diameter request includes an override parameter indicating a destination CDF for the Diameter session. When the Diameter request includes the override parameter, the method includes sending the Diameter request to the destination CDF if the destination CDF is available. When the Diameter request does not include the override parameter, the method includes selecting the destination CDF based on a distribution algorithm, inserting the override parameter in the Diameter request indicating the destination CDF, and sending the Diameter request to the destination CDF.

Another embodiment comprises a CTF of a network element. The CTF is configured to send a first Diameter request to a distributor unit for a Diameter session to implement offline charging, to receive a Diameter answer from the distributor unit that includes an override parameter indicating a destination Charging Data Function (CDF) selected by the distributor unit for the Diameter session, and to store information for the destination CDF for the Diameter session. The CTF is configured to generate a second Diameter request for the Diameter session, to insert the override parameter in the second Diameter request indicating the destination CDF, and to send the second Diameter request to the distributor unit.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the disclosure are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
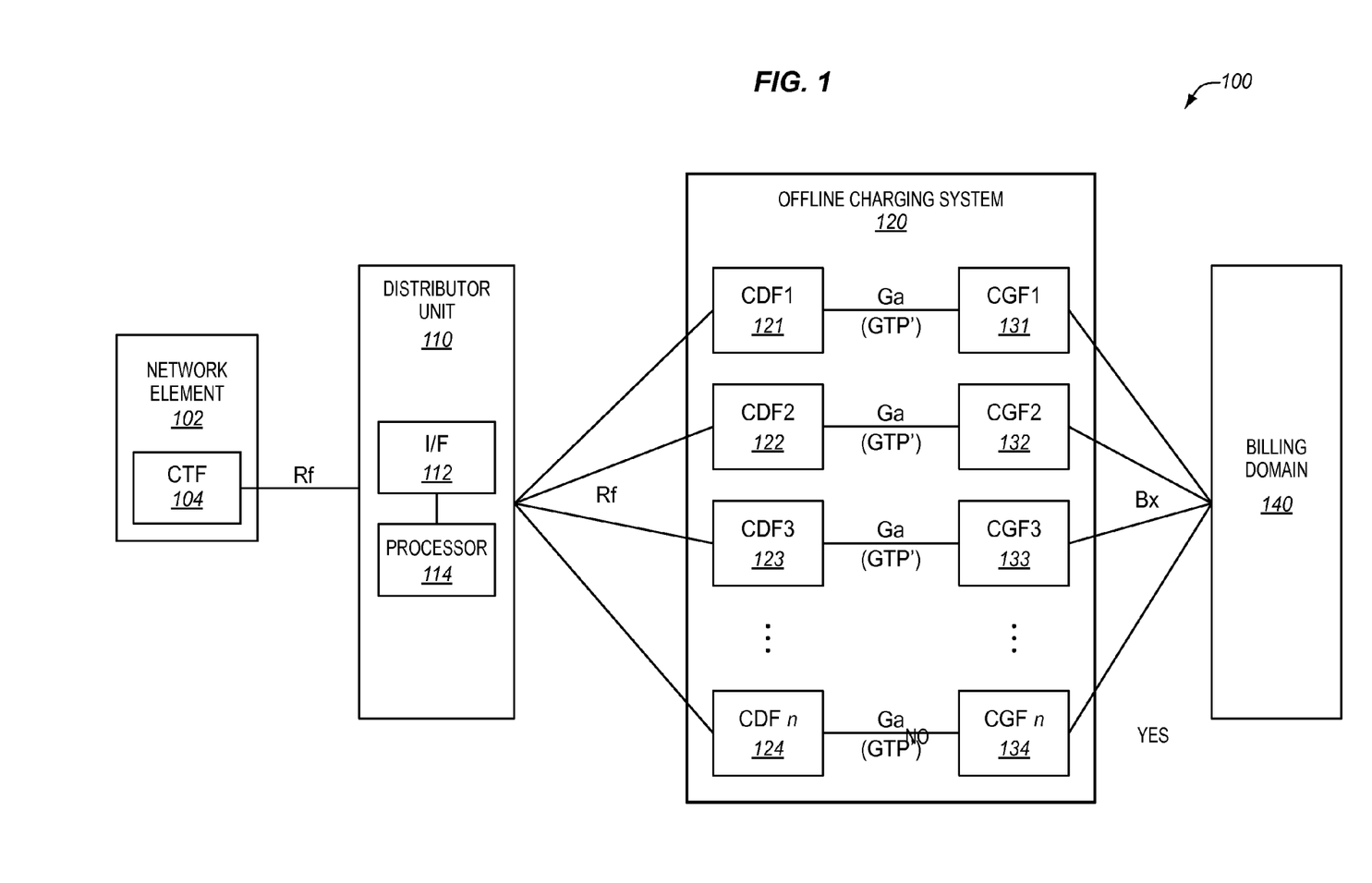
FIG. 1 illustrates an offline charging architecture in an exemplary embodiment.

FIG. 1 illustrates an offline charging architecture 100 in an exemplary embodiment. Architecture 100 may be implemented in a circuit-switched network or a packet-switched network that provides services to its subscribers (i.e., end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes a network element 102 that connects to an offline charging system (OFCS) 120 through a distributor unit 110. A network element 102 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 uses a Diameter Rf interface. Therefore, CTF 104 assembles the charging information into accounting requests, such as a Diameter Rf Accounting Request (ACR). Although one CTF 104 is illustrated in FIG. 1, there may be many CTFs in contact with distributor unit 110. Although not specifically illustrated in FIG. 1, network element 102 may include a processor or other hardware component to implement CTF 104.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an ACR EVENT. Session-based charging is the process of reporting usage reports for a session, and uses the START, INTERIM, and STOP accounting data. During a session, CTF 104 may transmit multiple ACR Interims depending on the proceeding of the session.

In this embodiment, OFCS 120 includes a plurality of CDFs (CDF1-CDFn) 121-124. A CDF comprises an element or module within OFCS 120 that receives charging events from CTFs within network elements, formats the charging events into CDRs, and sends the CDRs to a CGF. OFCS 120 also includes a plurality of CGFs (CGF1-CGFn) 131-134. A CGF comprises an element or module within OFCS 120 that correlates CDRs for a session, and forwards a CDR file with the correlated CDRs to a billing domain 140. Billing domain 140 is the part of the operator network that receives and processes CDR files for billing mediation and other billing applications (e.g., statistical applications). CDFs in OFCS 120 communicate with CGFs over a Diameter Ga interface. In the case shown in FIG. 1, GTP' is used on the Ga interface to transport CDRs from the CDFs to the CGFs. While a 1:1 relationship is shown between CDFs and CGFs in FIG. 1, an N:1 relationship is also possible. Although not specifically illustrated in FIG. 1, OFCS 120 may include one or more processors or other hardware components that implement CDFs 121-124 and CGFs 131-134.

Distributor unit 110 is implemented between CTFs (e.g., CTF 104) and the CDFs 121-124 in OFCS 120. The purpose of distributor unit 110 is to distribute Diameter requests or accounting requests (e.g., ACRs) from CTFs to the multiple CDFs 121-124 within OFCS 120. In this embodiment, distributor unit 110 includes an interface (I/F) 112 and a processor (PROC'R) 114. Interface 112 comprises a component (e.g., hardware, software, or a combination of hardware and software) for communicating via Diameter Rf protocol or another type of protocol. Processor 114 comprises a component (i.e., hardware) that performs logic to distribute Diameter requests to the CDFs 121-124. Although distributor unit 110 is illustrated as being outside of OFCS 120, distributor unit 110 may be implemented on the same platform as OFCS 120.

The task of distributing Diameter requests may include considering the weights, current load index, and other parameters of CDFs 121-124 to select a CDF instance for handling ACRs for a session. Distributor unit 110 may follow a round-robin strategy in selecting a CDF for a particular session. Distributor unit 110 may work as a Back to Back User Agent (B2BUA), where Diameter sessions with a CTF are terminated on distributor unit 110, and equivalent and corresponding Diameter sessions are started between distributor unit 110 and the selected CDF. Each CTF would have established a Diameter connection with distributor unit 110, and send a Diameter ACR to distributor unit 110 that includes a Diameter "SessionId". The Diameter "SessionId" is unique for the CTF for each session it reports.

Distributor unit 110 is configured to select CDFs for ACRs based on a distribution algorithm. A distribution algorithm comprises any set of rules for calculating a CDF identity for a Diameter session (e.g., a Diameter ACR). In one embodiment, distributor unit 110 may use a "consistent hashing" algorithm to select a CDF identity for a Diameter session. The consistent hashing algorithm may use the "SessionId" in the Diameter requests and CDF identifiers to select a CDF for a given Diameter request. With n CDFs present, such as in FIG. 1, the consistent hashing algorithm would generate N numbers for a given Diameter "SessionId". The highest of the numbers may be chosen as the CDF for the Diameter session. For example, distributor unit 110 may statically determine a hashed value for each CDF instance from its name:

Hs=F(CDFName)

E.g., Hs1=F(SvrNmCDF1), Hs2=F(SvrNmCDF2), and Hs3=F(SvrNmCDF3)

Then, distributor unit 110 may dynamically determine a hashed value for each Diameter "SessionId" (DSID):

Hi=F(DiameterSessionlD).

This value is used in computing the hash for each set of (DSID, CDFName) for each of the CDFs:

Hc=F(Hs, Hi)

Distributor unit 110 may then select the CDF with highest Hc value for handling the Diameter session with the Diameter "SessionId" in question.

Selecting a CDF identity based on a distribution algorithm as described above may also be acceptable the first time a Diameter request is received for a session. However, the distribution algorithm can be processor-intensive, and using the distribution algorithm each time a Diameter request is received can be a waste of resources. Also, selecting a CDF identity for a Diameter session based on a distribution algorithm may be acceptable when the CDFs on an OFCS are operating correctly. However, it is often the case that one or more CDFs may be out of service for a time period. For example, if the CDFs are executed on a blade server, then one or more CDFs may be out of service if there are problems with one or more of the blades. To illustrate the problem, a conventional distribution mechanism will use an algorithm to select a primary CDF for a Diameter session in response to receiving an initial ACR. If the primary CDF goes out of service, then the conventional distribution mechanism will select an alternate CDF for subsequent ACRs (e.g., interim). If the primary CDF happens to recover while the Diameter session is still active, then the conventional distribution mechanism will again use the algorithm to select the primary CDF for the Diameter session for subsequent ACRs. This scenario is a problem, as the primary CDF will receive some ACRs for the Diameter session, while the secondary CDF receives other ACRs for the session. This will cause 'incomplete CDR' generation on the primary CDF for the first part of the session, incomplete CDR generation on the secondary CDF for the second part of the session, and incomplete CDR generation again on the primary CDF for the last part of the session. This increases the complexity for the downstream billing mediation system to combine the multiple incomplete CDRs into a coherent and complete CDR for the session.

In the following embodiments, a new override parameter is defined in Diameter protocol to override the use of a distribution algorithm (or other type of distribution methodology) by distributor unit 110. As an overview, when a CDF is selected as the "destination CDF" for a Diameter session, an identifier or other information for the destination CDF is inserted in the new override parameter of a Diameter message (request or answer). When distributor unit 110 receives a Diameter request from a CTF, for example, distributor unit 110 is able to process the new override parameter of the Diameter request to identify the destination CDF for the Diameter session instead of using the distribution algorithm.

To illustrate the use of the override parameter in FIG. 1, CTF 104 detects a chargeable event for a service provided by network element 102, and CTF 104 assembles information for the chargeable event into a Diameter request. For example, the Diameter request may comprise a Diameter Rf ACR. CTF 104 may or may not insert an override parameter into the Diameter request at this point. For example, if the Diameter request is an ACR(start), then no destination CDF has been selected for this Diameter session. Thus, CTF 104 cannot insert a CDF identity for the destination CDF into an override parameter. If the Diameter request is an ACR(interim), then a destination CDF has been selected for this Diameter session and CTF 104 may be able to insert a CDF identity for the destination CDF into an override parameter. A further discussion of the operation of CTF is discussed below in relation to FIG. 4. CTF 104 then sends the Diameter request toward OFCS 120.

Figure 2:
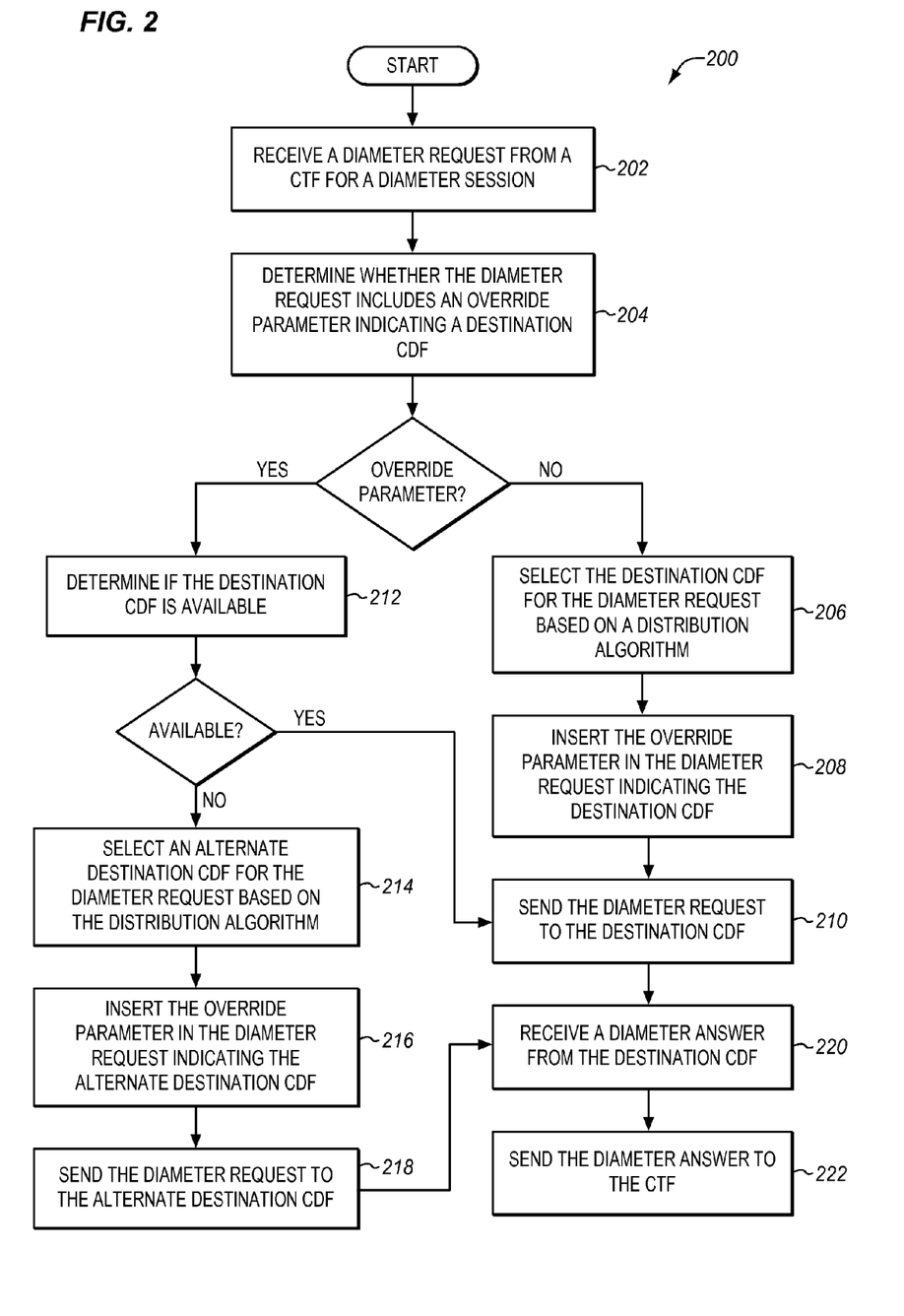
FIG. 2 is a flow chart illustrating a method for distributing Diameter requests in an exemplary embodiment.

FIG. 2 is a flow chart illustrating a method 200 for distributing Diameter requests in an exemplary embodiment. The steps of method 200 will be described with reference to distributor unit 110 in FIG. 1, but those skilled in the art will appreciate that method 200 may be performed in other systems. Also, the steps of the flow charts described herein are not all inclusive and may include other steps not shown, and the steps may be performed in an alternative order.

Interface 112 of distributor unit 110 receives the Diameter request from CTF 104 (step 202) for the Diameter session. Processor 114 then determines whether the Diameter request includes an override parameter indicating a destination CDF for the session (step 204). The override parameter may contain any value that indicates the identity of a CDF 121-124 that was previously selected for this Diameter session as the destination CDF. For example, if the present Diameter request is an "interim" request, then CDF 121 may have been previously selected for the Diameter session in response to a "start" request. The override parameter may include/contain a CDF identifier (ID) for the destination CDF, routing information for the destination CDF, or other information.

If/when the Diameter request does not include an override parameter, then processor 114 selects a destination CDF (e.g., one of CDFs 121-124) for the Diameter request based on the distribution algorithm (step 206). In other words, when the Diameter request does not indicate a destination CDF that has already been selected for the Diameter session, processor 114 selects the destination CDF for the Diameter request according to its normal procedure using the distribution algorithm. Although a distribution algorithm is indicated as the normal procedure in this embodiment, processor 114 may use other methods of selecting a CDF other than a distribution algorithm, such as a lookup table. If the Diameter request is a "start" message, then the Diameter request will not have an override parameter, and the distribution algorithm will be used to select the CDF. Processor 114 then inserts the override parameter in the Diameter request indicating the destination CDF selected for the Diameter session (step 208). Processor 114 then sends the Diameter request to the destination CDF (step 210) through interface 112.

If/when the Diameter request includes an override parameter indicating a destination CDF, then processor 114 determines if the destination CDF indicated in the override parameter is available (step 212). It may be the case that one or more CDFs 121-124 go out of service for a time period. Therefore, processor 114 determines whether the destination CDF indicated in the override parameter is available or in service. If the destination CDF is available, then processor 114 sends the Diameter request to the destination CDF (step 210). The Diameter request still includes the override parameter indicating the destination CDF. Processor 114 in essence overrides its normal logic of selecting a destination CDF for a Diameter request using the distribution algorithm when the Diameter request includes an override parameter indicating a destination CDF. Due to the override, processor 114 does not need to process the distribution algorithm to select a destination CDF for this Diameter request. If the Diameter request is either an "interim" or a "stop" message, then there should be an override parameter inserted in the Diameter request indicating the destination CDF already selected for the Diameter session.

If the destination CDF indicated in the override parameter is not available, then processor 114 selects an alternate destination CDF (e.g., one of CDFs 121-124) for the Diameter request based on the distribution algorithm (step 214). Processor 114 then inserts the override parameter in the Diameter request indicating the alternate destination CDF selected for the Diameter session (step 216), and sends the Diameter request to the alternate destination CDF (step 218) through interface 112.

The override parameter may be inserted in all Diameter messages for this Diameter session so that each Diameter request is routed to the same CDF. For example, after a CDF is selected by distributor unit 110 for the session (e.g., based on the distribution algorithm), distributor unit 110 may insert the override parameter with the identity of the destination CDF in each Diameter message for the session. Therefore, Diameter requests sent from distributor unit 110 to the destination CDF include the override parameter. Likewise, Diameter answers (e.g., Diameter ACA) sent from the destination CDF to distributor unit 110 may also include the override parameter. Further, Diameter answers sent from distributor unit 110 to CTF 104 may also include the override parameter. Therefore, distributor unit 110 is able to notify the other elements (e.g., CTF 104 and the destination CDF) of the CDF identity selected for the Diameter session so that an override process can be performed. These elements can then include the override parameter in Diameter messages so that each Diameter request for the Diameter session is routed to the same CDF. This is further illustrated in FIGS. 3-4.

Figure 3:
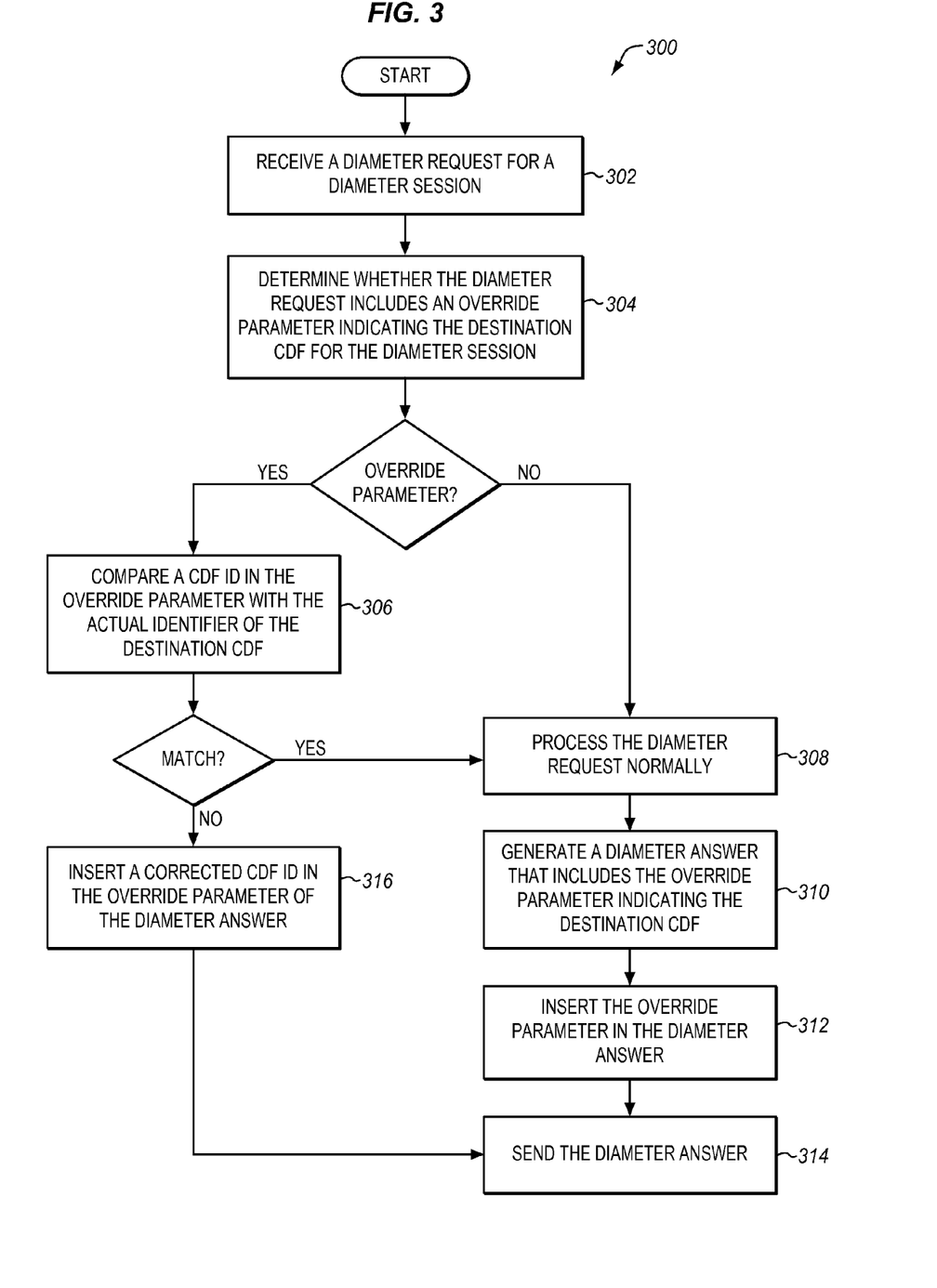
FIG. 3 is a flow chart illustrating a method for implementing an override process in an exemplary embodiment.

FIG. 3 is a flow chart illustrating a method 300 for implementing an override process in an exemplary embodiment. The steps of method 300 will be described with reference to CDF 121 in FIG. 1, but those skilled in the art will appreciate that method 300 may be performed in other systems.

The destination CDF (CDF 121) receives the Diameter request from distributor unit 110 (step 302). CDF 121 then determines whether the Diameter request includes an override parameter indicating the destination CDF for the Diameter session (step 304). If the Diameter request includes an override parameter, then CDF 121 compares a CDF ID in the override parameter with its own identifier (i.e., the actual identifier of CDF 121) (step 306). If the IDs match, then CDF 121 processes the Diameter request normally (step 308), which may include generating a Charging Data Record (CDR). CDF 121 also generates a Diameter answer (e.g., Accounting Answer (ACA)) as a response to the Diameter request (step 310), and inserts the override parameter in the Diameter answer indicating the destination CDF (step 312). CDF 121 may copy the override parameter from the Diameter request into the Diameter answer. CDF 121 then sends the Diameter answer to distributor unit 110 (step 314). If the IDs do not match, then CDF 121 may insert a corrected CDF ID in the override parameter of the Diameter answer (step 316).

Figure 4:
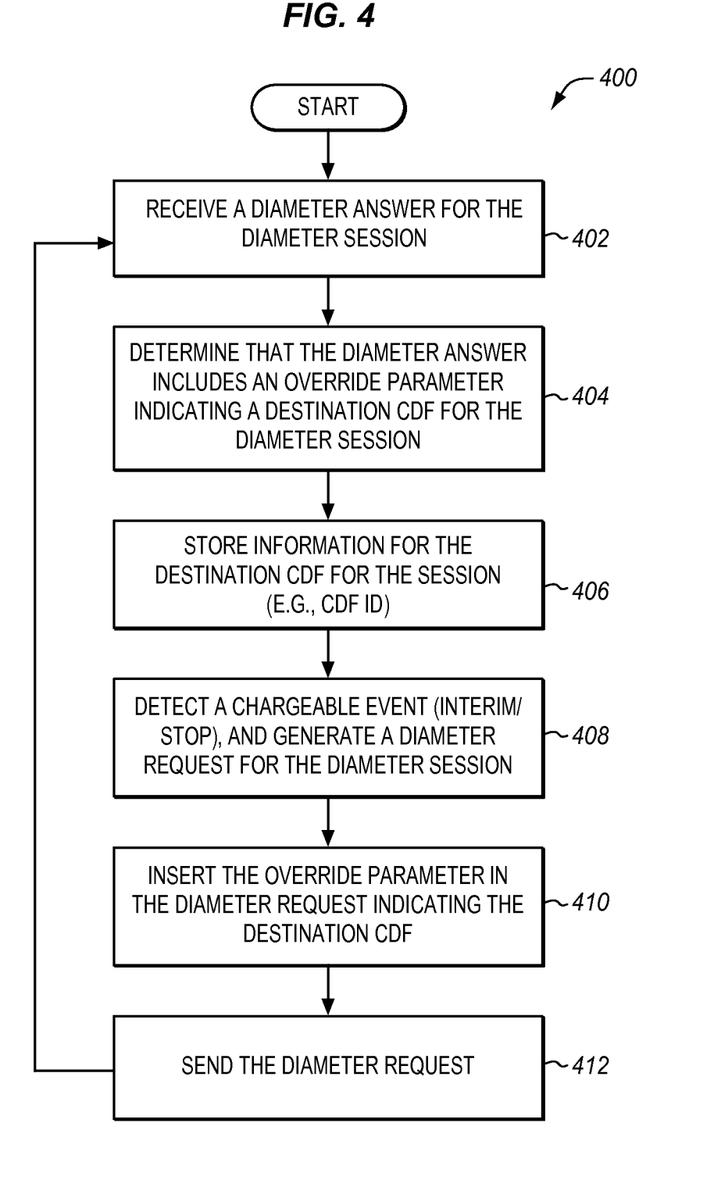
FIG. 4 is a flow chart illustrating another method for implementing an override process in an exemplary embodiment.

Referring to FIG. 2, distributor unit 110 receives the Diameter answer from CDF 121 (step 220), and sends the Diameter answer to CTF 104 with the override parameter (step 222). FIG. 4 is a flow chart illustrating a method 400 for implementing an override process in an exemplary embodiment. The steps of method 400 will be described with reference to CTF 104 in FIG. 1, but those skilled in the art will appreciate that method 400 may be performed in other systems.

CTF 104 receives the Diameter answer from distributor unit 110 (step 402). CTF 104 then determines that the Diameter answer includes the override parameter indicating a destination CDF for the Diameter session (step 404). CTF 104 then stores information for the destination CDF for the Diameter session (step 406), such as in a memory. CTF 104 may have a buffer for the Diameter sessions that are open, and the Diameter sessions are indexed or referenced in the buffer according to the "SessionId". CTF 104 can therefore store information for the destination CDF along with other information for the Diameter session. For example, CTF 104 may store a CDF ID for the destination CDF for the Diameter session. CTF 104 stores the destination CDF information for the lifetime of the Diameter session, and deletes the destination CDF information when the session ends.

CTF 104 then detects another chargeable event, and generates another Diameter request for the Diameter session (step 408). Based on the information it has stored for the Diameter session, CTF 104 is able to determine that a destination CDF has already been selected for this Diameter session. Therefore, CTF 104 inserts the override parameter in the Diameter request indicating the destination CDF for the Diameter session (step 410). For example, CTF 104 may insert a CDF ID for the destination CDF in the override parameter. CTF 104 then sends the Diameter request to distributor unit 110 (step 412).

The override process then continues in distributor unit 110 (see FIG. 2).

In order to provide the override parameter in the requests/answers as described above, a new Attribute Value Pair (AVP)

may be defined in Diameter. The new AVP may have an attribute name of "CDF-Override", although other attribute names may be used. This AVP is optional and its purpose is to create a marker for the messages that belong to a particular Diameter session. This AVP is of type "DiamIdent" (Diameter Identity) and is populated with the identity of the CDF instance selected for a Diameter session. The following illustrates the new AVP in a Diameter ACR:

<ACR>::=<Diameter Header: 271, REQ, PXY>
    <Session-Id>
    {Origin-Host}
    {Origin-Realm}
    {Destination-Realm}
    {Accounting-Record-Type}
    {Accounting-Record-Number}
    [Acct-Application-Id]
    [Vendor-Specific-Application-Id]
    [User-Name]
    [Destination-Host]
    [Accounting-Sub-Session-Id]
    [Acct-Session-Id]
    [Acct-Multi-Session-Id]
    [Acct-Interim-Interval]
    [Accounting-Realtime-Required]
    [Origin-State-Id]
    [Event-Timestamp]
    * [Proxy-Info]
    * [Route-Record]
    [CDF-Override]
    * [AVP]

Following the "SISE" convention, the CDF-Override AVP would be expected to follow "-IS-", meaning that it is not expected in the ACR Start and ACR Event, while it is expected in the ACR Interim and ACR Stop.

The following illustrates the new AVP in a Diameter ACA:

<ACA>::=<Diameter Header: 271, PXY>
    <Session-Id>
    {Result-Code}
    {Origin-Host}
    {Origin-Realm}
    {Accounting-Record-Type}
    {Accounting-Record-Number}
    [Acct-Application-Id]
    [Vendor-Specific-Application-Id]
    [User-Name]
    [Accounting-Sub-Session-Id]
    [Acct-Session-Id]
    [Acct-Multi-Session-Id]
    [Error-Message]
    [Error-Reporting-Host]
    [Failed-AVP]
    [Acct-Interim-Interval]
    [Accounting-Realtime-Required]
    [Origin-State-Id]
    [Event-Timestamp]
    * [Proxy-Info]
    [CDF-Override]
    * [AVP]

Following the "SISE" convention, the CDF-Override AVP would be expected to follow "SI--", meaning that it is not expected in the ACA Stop and ACA Event, while it is expected in the ACA Start and ACA Interim.

Figure 5:
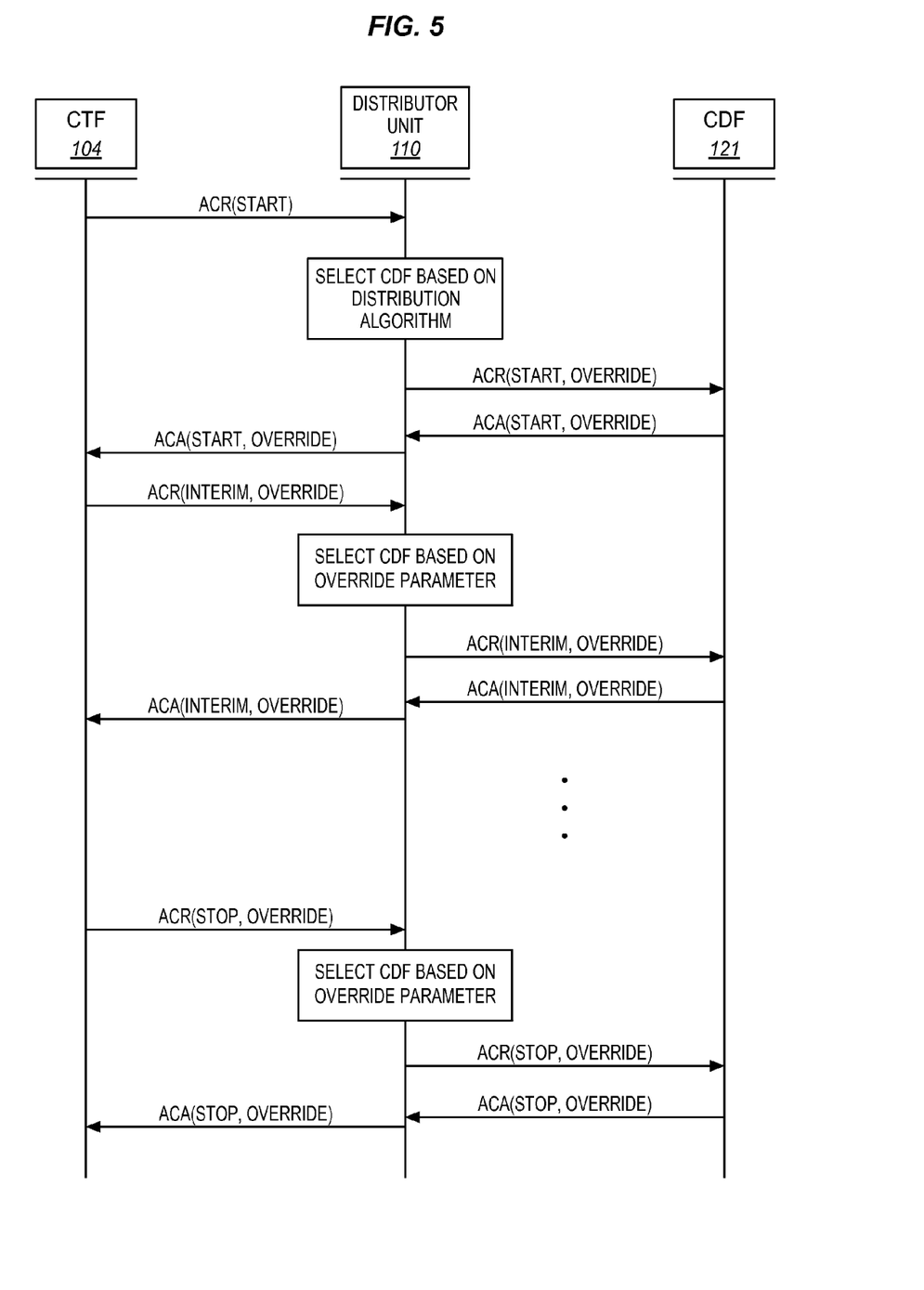
FIG. 5 is a message diagram illustrating the distribution of Diameter ACRs in an exemplary embodiment.

FIG. 5 is a message diagram illustrating distribution of Diameter ACRs in an exemplary embodiment. To begin in FIG. 5, CTF 104 detects a chargeable event for a service provided by network element 102 (see FIG. 1). CTF 104 assembles information for the chargeable event into a Diameter Rf ACR to initiate a Diameter session. The type of accounting for the service is session-based, so CTF 104 inserts a "start" value in the Accounting-Record-Type AVP of the ACR. CTF 104 then sends the ACR(start) to distributor unit 110.

In response to receiving the ACR(start), distributor unit 110 determines whether the ACR(start) includes an override parameter. More particularly, distributor unit 110 may determine whether a "CDF-Override" AVP is included in the ACR (start). Because the Diameter session has just started, a destination CDF has not been selected for the Diameter session. Therefore, the ACR(start) does not include a "CDF-Override" AVP that indicates the destination CDF. Distributor unit 110 selects a destination CDF for the Diameter session based on the distribution algorithm (i.e., consistent hashing algorithm). In this instance, distributor unit 110 selects CDF 121 to handle the Diameter session. Because a destination CDF has been selected for this Diameter session, distributor unit 110 inserts the override parameter (e.g., "CDF-Override" AVP) in the ACR(start). A value in the override parameter indicates the identity of CDF 121. For example, if the identifier for CDF 121 is "SrvrNameCDF1", then distributor unit 110 inserts this value into the override parameter. Distributor unit 110 then routes the ACR(start) to CDF 121.

CDF 121 receives the ACR(start), and determines that the ACR(start) includes the override parameter. CDF 121 determines whether the CDF identity in the override parameter matches its own identity. If so, CDF 121 processes the ACR (start) normally, and generates a Diameter Rf Accounting Answer (ACA) as a response to the ACR(start). CDF 121 inserts the override parameter in the ACA(start) with the same CDF identity (of CDF 121) that was indicated in the ACR (start). CDF 121 then sends the ACA(start) to distributor unit 110.

Distributor unit 110 receives the ACA(start), and routes the ACA(start) to CTF 104 with the override parameter. CTF 104 then stores the CDF identity for CDF 121 along with other information for the Diameter session. At a later time, CTF 104 detects another chargeable event, and assembles information for the chargeable event into another Diameter ACR for the Diameter session. CTF 104 inserts a record type into the Diameter request indicating the ACR as an "interim" message. CTF 104 also determines that a destination CDF has already been selected for this Diameter session based on the override parameter provided in a prior ACA message (i.e., ACA(start)). Therefore, CTF 104 inserts the override parameter (e.g., "CDF-Override" AVP) in the ACR(interim). A value in the override parameter indicates the identity of CDF 121. CTF 104 then sends the ACR(interim) to distributor unit 110.

In response to receiving the ACR(interim), distributor unit 110 determines whether the ACR(interim) includes an override parameter. More particularly, distributor unit 110 may determine whether a "CDF-Override" AVP is included in the ACR(interim). In this instance, the ACR(interim) does include an override parameter that indicates the identity of a destination CDF already selected for the Diameter session. Therefore, distributor unit 110 overrides the distribution algorithm, and routes the ACR(interim) to CDF 121, which is the destination CDF indicated in the override parameter. Distributor unit 110 does not need to recalculate values for each CDF again based on the distribution algorithm in order to select the destination CDF for the Diameter session.

CDF 121 receives the ACR(interim), and determines that the ACR(interim) includes the override parameter. CDF 121 also determines whether the CDF identity in the override parameter matches its own identity. If so, CDF 121 processes the ACR(interim) normally, and generates an ACA(interim) as a response to the ACR(interim). CDF 121 inserts the override parameter in the ACA(interim) with the same CDF identity (of CDF 121) that was indicated in the ACR(interim). CDF 121 then sends the ACA(interim) to distributor unit 110. Distributor unit 110 receives the ACA(interim), and routes the ACA(interim) to CTF 104 with the override parameter.

CTF 104 may detect multiple interim events, and send multiple ACRs(interim) to distributor unit 110. Distributor unit 110 operates as described above for each ACR(interim) it receives.

At some point, CTF 104 detects a final chargeable event, and assembles information for the chargeable event into a Diameter ACR(stop) for the Diameter session. CTF 104 inserts a record type into the ACR to indicate the ACR as a "stop" message. CTF 104 also determines that a destination CDF has already been selected for this Diameter session based on the override parameter provided in a prior ACA message (i.e., ACA(interim)). Therefore, CTF 104 inserts the override parameter (e.g., "CDF-Override" AVP) in the ACR (stop). A value in the override parameter indicates the identity of CDF 121. CTF 104 then sends the ACR(stop) to distributor unit 110.

In response to receiving the ACR(stop), distributor unit 110 determines whether the ACR(stop) includes an override parameter. More particularly, distributor unit 110 may determine whether a "CDF-Override" AVP is included in the ACR (stop). In this instance, the ACR(stop) does include an override parameter, so distributor unit 110 overrides the distribution algorithm, and routes the ACR(stop) to CDF 121, which is the destination CDF indicated in the override parameter.

One advantage to using the override process as described above is that distributor unit 110 can avoid calculating hashed values for each CDF in OFCS 120 when receiving ACR (interim)/(stop) messages. A CDF has already been selected for the Diameter session in response to an ACR(start). Therefore, the identity for the destination CDF is provided in the override parameter, and distributor unit 110 does not need to process the distribution algorithm in order to select a destination CDF for each Diameter ACR.

Figure 6:
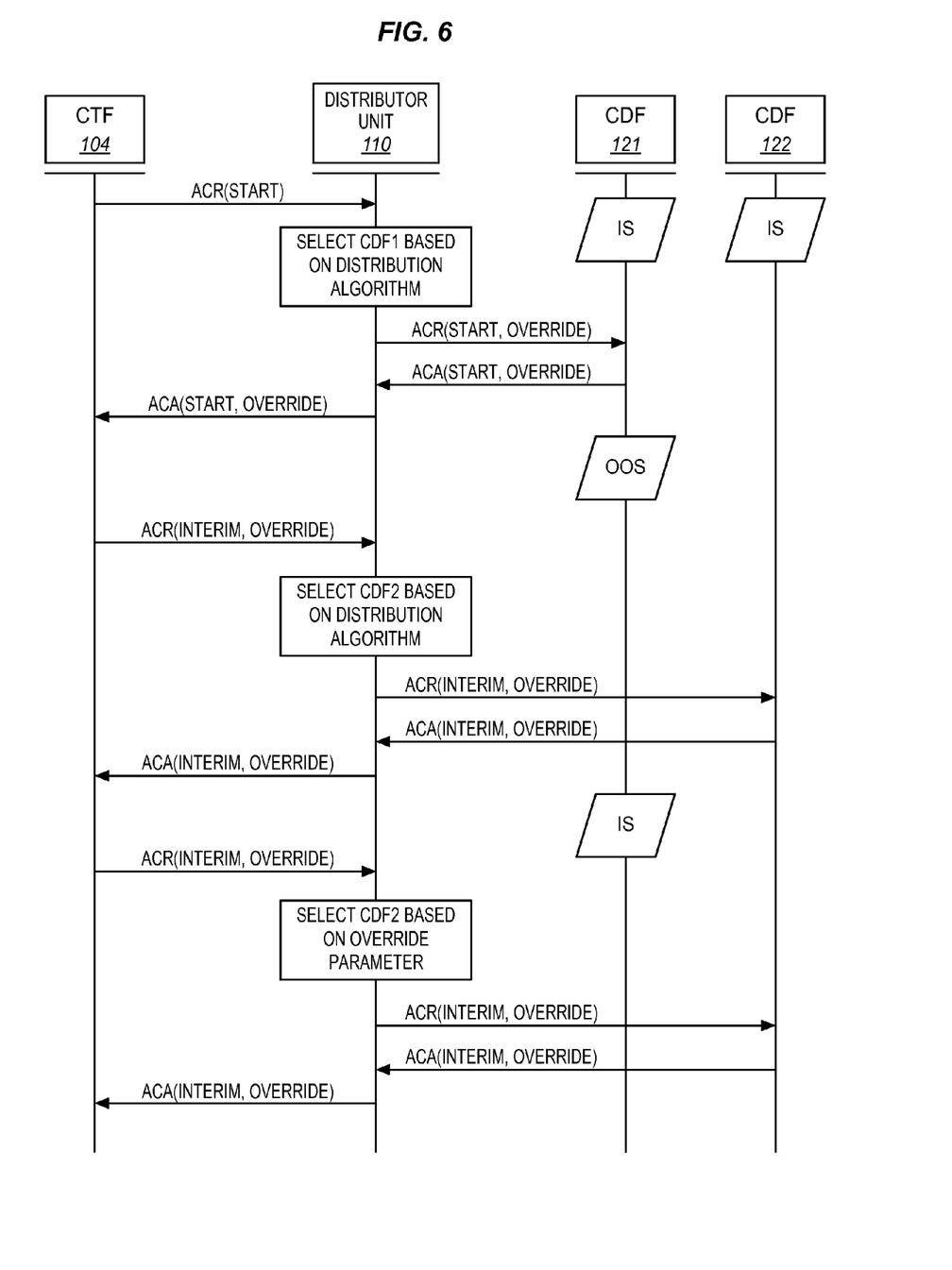
FIG. 6 is another message diagram illustrating the distribution of Diameter ACRs in an exemplary embodiment.

FIG. 6 is another message diagram illustrating distribution of Diameter ACRs in an exemplary embodiment. The scenario illustrated in FIG. 6 is one where a CDF is not available, and the distribution algorithm is overridden based on the override parameter. To begin in FIG. 6, CTF 104 detects a chargeable event for a service provided by network element 102 (see FIG. 1), and assembles an ACR(start) for the Diameter session. CTF 104 then sends the ACR(start) to distributor unit 110. In response to receiving the ACR(start), distributor unit 110 determines whether the ACR(start) includes an override parameter. More particularly, distributor unit 110 may determine whether a "CDF-Override" AVP is included in the ACR(start). Because the Diameter session has just started, a destination CDF has not been selected for the Diameter session. Therefore, the ACR(start) does not include a "CDF-Override" AVP that indicates the destination CDF. Distributor unit 110 selects a destination CDF for the Diameter session based on the distribution algorithm (i.e., consistent hashing algorithm). In this instance, distributor unit 110 selects CDF 121 to handle the Diameter session. Because a destination CDF has been selected for this Diameter session, distributor unit 110 inserts the override parameter (e.g., "CDF-Override" AVP) in the ACR(start). Distributor unit 110 then routes the ACR(start) to CDF 121. CDF 121 then sends the ACA(start) to distributor unit 110, which it routes to CTF 104. CTF 104 then stores the CDF identity for CDF 121 along with other information for the Diameter session.

At a later time, CTF 104 detects another chargeable event, and assembles an ACR(interim). CTF 104 also determines that a destination CDF has already been selected for this Diameter session based on the override parameter provided in a prior ACA message (i.e., ACA(start)). Therefore, CTF 104 inserts the override parameter (e.g., "CDF-Override" AVP) in the ACR(interim), with a value indicating the identity of CDF 121. CTF 104 then sends the ACR(interim) to distributor unit 110.

In response to receiving the ACR(interim), distributor unit 110 determines whether the ACR(interim) includes an override parameter. More particularly, distributor unit 110 may determine whether a "CDF-Override" AVP is included in the ACR(interim). In this instance, the ACR(interim) does include an override parameter that indicates the identity of a destination CDF already selected for the Diameter session. Distributor unit 110 determines whether CDF 121 is available for the ACR(interim). In this case, CDF 121 has gone out of service (OOS) and is not available for the ACR(interim). Therefore, distributor unit 110 selects an alternate destination CDF for the Diameter session based on the distribution algorithm. In this instance, distributor unit 110 selects CDF 122 to handle the Diameter session, as it is in service (IS) at this time. Distributor unit 110 updates the override parameter (e.g., "CDF-Override" AVP) in the ACR(interim) to indicate CDF 122 as the destination CDF. Distributor unit 110 then routes the ACR(interim) to CDF 122.

CDF 122 then sends the ACA(interim) to distributor unit 110, which it routes to CTF 104. CTF 104 then stores the CDF identity for CDF 122 along with other information for the Diameter session.

If CTF 104 detects another interim chargeable event, it assembles another ACR(interim). CTF 104 also determines that a destination CDF has already been selected for this Diameter session based on the override parameter provided in a prior ACA message (i.e., ACA(interim)). Therefore, CTF 104 inserts the override parameter (e.g., "CDF-Override" AVP) in the ACR(interim), with a value indicating the identity of CDF 122. CTF 104 then sends the ACR(interim) to distributor unit 110.

In response to receiving the ACR(interim), distributor unit 110 determines whether the ACR(interim) includes an override parameter. In this instance, the ACR(interim) does include an override parameter that indicates the identity of a destination CDF already selected for the Diameter session. Distributor unit 110 determines whether CDF 122 is available for the ACR(interim). In this case, CDF 122 is in service and is available for the ACR(interim). Therefore, distributor unit 110 routes the ACR(interim) to CDF 122 based on the information provided in the override parameter. FIG. 6 shows that CDF 121 had recovered at this time, and was in service. However, distributor unit 110 identifies the destination CDF based on the information in the override parameter. If distributor unit 110 were to select the destination CDF based on the distribution algorithm, it would have again selected CDF 121 as the destination CDF. One advantage to using the override process described above is that it prevents an out-of-service CDF from "hijacking" a Diameter session upon becoming in-service. If a distribution algorithm is used to select the destination CDF for a Diameter session but this destination CDF goes out-of-service, then the distribution algorithm will be used to select an alternate destination CDF. If the original destination CDF happens to recover while the Diameter session is still active, the distribution algorithm would again select the destination CDF for the Diameter session for subsequent ACRs. Using the override process described herein, CDF selection is forced by the CDF identity in the override parameter. Therefore, even if the original destination CDF recovers during the Diameter session, the override parameter will force distributor unit 110 so use the alternate destination CDF. The alternate destination CDF will therefore be selected for the Diameter session instead of switching back to the original destination CDF once it recovers.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:

1. An apparatus comprising:
a distributor unit configured to connect to a plurality of Charging Data Functions (CDFs) of an offline charging system;
the distributor unit comprising a processor configured to receive a Diameter request from a Charging Trigger Function (CTF) for a Diameter session, and to determine whether the Diameter request includes an override parameter indicating a destination CDF for the Diameter session;
when the Diameter request includes the override parameter, the distributor unit is configured to send the Diameter request to the destination CDF if the destination CDF is available;
when the Diameter request does not include the override parameter, the distributor unit is configured to select the destination CDF based on a distribution algorithm, to insert the override parameter in the Diameter request indicating the destination CDF, and to send the Diameter request to the destination CDF.

2. The apparatus of claim 1 wherein:
when the destination CDF indicated in the override parameter is not available, the distributor unit is configured to select an alternate destination CDF based on the distribution algorithm, to insert the override parameter in the Diameter request with a CDF identifier for the alternate destination CDF, and to send the Diameter request to the alternate destination CDF.

3. The apparatus of claim 1 wherein:
the distribution algorithm comprises a consistent hashing algorithm that selects the destination CDF based on a session identifier in the Diameter request.

4. The apparatus of claim 1 wherein:
the Diameter request comprises a Diameter Accounting Request (ACR).

5. The apparatus of claim 1 wherein:
the override parameter comprises a Diameter Attribute Value Pair (AVP).

6. The apparatus of claim 5 wherein:
the Diameter AVP has an attribute name of "CDF-Override".

7. The apparatus of claim 1 wherein:
the distributor unit is configured to receive a Diameter answer from the destination CDF that includes the override parameter, and to send the Diameter answer to the CTF.

8. The apparatus of claim 1 wherein:
the CTF is configured to receive the Diameter answer from the distributor unit, and to store information for the destination CDF for the Diameter session;
the CTF is configured to generate another Diameter request for the Diameter session, to insert the override parameter in the other Diameter request indicating the destination CDF, and to send the other Diameter request to the distributor unit.

9. A method comprising:
receiving a Diameter request in a distributor unit from a Charging Trigger Function (CTF) for a Diameter session, wherein the distributor unit connects to a plurality of Charging Data Functions (CDFs) of an offline charging system;
determining, by the distributor unit, whether the Diameter request includes an override parameter indicating a destination CDF for the Diameter session;
when the Diameter request includes the override parameter, the method includes:
sending the Diameter request to the destination CDF if the destination CDF is available;
when the Diameter request does not include the override parameter, the method includes:
selecting the destination CDF based on a distribution algorithm;
inserting the override parameter in the Diameter request indicating the destination CDF; and
sending the Diameter request to the destination CDF.

10. The method of claim 9 wherein:
when the destination CDF indicated in the override parameter is not available, the method includes:
selecting an alternate destination CDF based on the distribution algorithm;
inserting the override parameter in the Diameter request with a CDF identifier for the alternate destination CDF; and
sending the Diameter request to the alternate destination CDF.

11. The method of claim 9 wherein:
the distribution algorithm comprises a consistent hashing algorithm that selects the destination CDF based on a session identifier in the Diameter request.

12. The method of claim 9 wherein:
the Diameter request comprises a Diameter Accounting Request (ACR).

13. The method of claim 9 wherein:
the override parameter comprises a Diameter Attribute Value Pair (AVP).

14. The method of claim 13 wherein:
the Diameter AVP has an attribute name of "CDF-Override".

15. The method of claim 9 further comprising:
receiving a Diameter answer in the distributor unit from the destination CDF that includes the override parameter; and
sending the Diameter answer from the distributor unit to the CTF.

16. The method of claim 9 further comprising:
receiving the Diameter answer in the CTF from the distributor unit;
storing information for the destination CDF for the Diameter session;
generating another Diameter request for the Diameter session in the CTF;
inserting the override parameter in the other Diameter request indicating the destination CDF; and
sending the other Diameter request from the CTF to the distributor unit.

17. An apparatus comprising:
a Charging Trigger Function (CTF) provided by a processor of a network element;
the CTF is configured to send a first Diameter request to a distributor unit for a Diameter session to implement offline charging, to receive a Diameter answer from the distributor unit that includes an override parameter indicating a destination Charging Data Function (CDF) selected by the distributor unit for the Diameter session, and to store information for the destination CDF for the Diameter session;
the CTF is configured to generate a second Diameter request for the Diameter session, to insert the override parameter in the second Diameter request indicating the destination CDF, and to send the second Diameter request to the distributor unit.

18. The apparatus of claim 17 wherein:
the first Diameter request comprises a Diameter Accounting Request (ACR).

19. The apparatus of claim 17 wherein:
the override parameter comprises a Diameter Attribute Value Pair (AVP).

20. The apparatus of claim 19 wherein:
the Diameter AVP has an attribute name of "CDF-Override".

* * * * *